(12) United States Patent
Caulder et al.

(10) Patent No.: US 8,676,281 B1
(45) Date of Patent: Mar. 18, 2014

(54) INTERCHANGEABLE COLOR BACKGROUNDS FOR CELL PHONE PROTECTOR CASES

(75) Inventors: David Caulder, Woodland Hills, CA (US); Hong Dong, Diamond Bar, CA (US)

(73) Assignee: Valor Communication, Inc., City of Industry, CA (US)

( * ) Notice: Subject to any disclaimer, the term of this patent is extended or adjusted under 35 U.S.C. 154(b) by 0 days.

(21) Appl. No.: 13/426,496

(22) Filed: Mar. 21, 2012

(51) Int. Cl.
*H04M 1/00* (2006.01)

(52) U.S. Cl.
USPC ..................... 455/575.8; 455/575.1

(58) Field of Classification Search
USPC ............ 361/679.01, 679.09, 679.55; 206/38; 455/90.3, 575.8, 575.1, 575.3
See application file for complete search history.

(56) References Cited

U.S. PATENT DOCUMENTS

| | | | | |
|---|---|---|---|---|
| 6,201,867 B1 * | 3/2001 | Koike | ...................... | 379/433.11 |
| 7,206,618 B2 * | 4/2007 | Latto et al. | ................. | 455/575.8 |
| 8,047,364 B2 * | 11/2011 | Longinotti-Buitoni | ....... | 206/320 |
| 8,395,894 B2 * | 3/2013 | Richardson et al. | ..... | 361/679.55 |
| 2006/0052063 A1 * | 3/2006 | Lohr | ............................. | 455/90.3 |
| 2008/0053770 A1 * | 3/2008 | Tynyk | ........................... | 190/100 |
| 2011/0036876 A1 * | 2/2011 | Fathollahi | ..................... | 224/191 |

* cited by examiner

*Primary Examiner* — Sonny Trinh
(74) *Attorney, Agent, or Firm* — Thomas I. Rozsa

(57) ABSTRACT

A transparent cell phone protector case where the face of the cell phone is facing away from the rear of the transparent cell phone protector case. This case is a snap fit over the cell phone and sandwiches a decorative accessory color card between the transparent cell phone protector case and the cell phone. The invention is to insert a card of a different color between the back of the cell phone and the acrylic transparent case so that the colored card gives the cell phone protector case a different colored appearance. A set of these colored cards can be sold so that an individual can exchange the color to match the outfit they are wearing.

21 Claims, 5 Drawing Sheets

INTERCHANGEABLE COLOR BACKGROUNDS FOR CELL PHONE PROTECTOR CASES

FIELD OF THE INVENTION

The present invention involves decorated cell phone protector cases which are designed so that the face of the cell phone is visible for making telephone calls, receiving telephone calls and performing other cell phone functions such as text messaging. The field involves making the cell phone protector case a decorative accessory item in addition to being a cell phone protector case functional item.

DESCRIPTION OF THE PRIOR ART

The following ten patents are relevant to the present invention.

1. U.S. Pat. No. 4,292,481 issued to Wayne R. Barnes et al. on Sep. 29, 1981 for "Decorative Applique And Decorative Faceplate Assembly For Push-Button Telephones" (hereafter the "Barnes patent");
2. U.S. Pat. No. 6,608,996 issued to Salla Laurikka et al. on Aug. 19, 2003 for "Cover For An Electronic Device" (hereafter the "Laurikka patent");
3. United States Published Patent Application No. 2004/0253998 to Tom Dunleavy et al. on Dec. 16, 2004 for "Film Layer, Assembly And Method For Altering The Appearance of a Mobile Station" (hereafter the "Dunleavy Published patent application");
4. U.S. Pat. No. 7,206,618 issued to Antonia T. Latto et al. on Apr. 17, 2007 for "Removable customizable Inserts And Faceplate For Electronic Devices" (hereafter the "Latto patent");
5. U.S. Pat. No. 7,230,823 issued to Curtis R. Richardson et al. on Jun. 12, 2007 for "Protective Membrane For Touch Screen Device" (hereafter the "Richardson patent");
6. United States Published Patent Application No. 2007/0161421 to Antonio T. Latto et al. on Jul. 12, 2007 for "Removable Customizable Inserts And Faceplate For Electronic Devices" (hereafter the "'0161421 Latto Published patent application");
7. U.S. Design Pat. No. D598,909 issued to Jin-Gyu Seo on Aug. 25, 2009 for "Cover of Portable Phone" (hereafter the "Seo Design patent");
8. United States Published Patent Application No. 2009/0325657 to Richard A. Ramsdell et al. on Dec. 31, 2009 for "Customizable Universal Protective Case For A Portable Electronic Device" (hereafter the "Ramsdell Published patent application");
9. United States Published Patent Application No. 2010/0240427 to Edmund S. Lee on Sep. 23, 2010 for "Multi-Piece Mobile Media Device Enclosure" (hereafter the "Lee Published patent application");
10. United States Published Patent application No. 2011/0065487 to Antonio T. Latto et al. on Mar. 17, 2011 for "User Interchangeable Ornamental Portions of Electronic Devices" (hereafter the "'0065487 Latto Published patent application").

The Barnes patent issued in 1981 and expired long ago. This patent discloses:

"A decorative applique has a profile corresponding to that of standard push-button telephone faceplates and the top surface of the applique contains a decorative design in the form of colors, patterns and the like. Openings are provided in the applique for receiving therethrough the telephone push-buttons thereby enabling the applique to be easily installed over the telephone faceplate. A transparent faceplate assembly is provided with a slot having a shape similar to that of the decorative applique and into which the decorative applique is inserted so that the decorative design is visible through the top of the transparent faceplate assembly."

Referring to the patent text, it states:

"Another variant of the push-button telephone faceplate assembly constructed according to the principles of the present invention is shown in FIG. 3 and those parts corresponding to parts shown in FIG. 2 are similarly numbered with the additional suffix "a". In this variation, a transparent faceplate 50 is provided with an elongated slot 51 dimensioned to receive therein the decorative applique 46a. The elongated slot 51 is shaped similar to that of the peripheral edge of the applique 46a so that the applique fits snugly within the slot. In all other respects, the transparent faceplate 50 is similar to that of the transparent faceplate 40 of FIG. 2."

The Laurikka patent discloses:

"A cover (1) of an electronic device (7) is at least partly formed or coated by using a material whose color is arranged changeable at least partly by means of at least one control signal."

Claim 1 of the patent reads as follows:

"A cover (1) of an electronic device (7), characterized in that the cover (1) is at least partly fanned or coated by using electronic ink (5) whose colour is changeable at least partly by means of at least one control signal, said electronic ink, containing electrically charged particles (3), and that in connection with, conductors (4a, 4b), in the cover, for conducting the control signal to the electronic ink (5), to attain a change in the colour of the cover."

The Dunleavy Published patent application discloses:

"A film layer for a mobile station that allows the appearance of the mobile station to be easily changed. The layer is thin enough to allow it to be positioned between the plungers on a plunger mat and the keys on a key mat of the mobile station. Flexibility of the film layer allows a key press to be transmitted through the film insert to one of the plungers, which in turn compresses a contact on a printed wiring board. Flexibility may be due to perforations around the keys of the key mat. Preferably, the film layer includes some visually detectable characteristic, such as a color, that is visible through openings or translucent portions of the key mat. The film layer may be constructed of various materials, such as paper, elastomer, polymer or electric luminescent materials which can be interchangeably inserted into the mobile station to change its appearance."

The patent application further states:

"A mobile station 10 of one embodiment of the present invention is shown in the exploded view of FIG. 1. Among other components, the mobile station includes a bottom cover 11, a printed wiring or other circuit board 12 (shown in an alternative embodiment illustrated in FIG. 4), a plunger mat 13, a film layer 14, a key mat 15 having a plurality of keys 20, a top cover 16 and a display or view screen 17. Advantageously, the visual appearance of the mobile station can be changed or customized by a user by exchanging the film layer 14 for other film layers, as will be described in more detail below."

The '618 Latto patent is for removable customizable inserts and faceplate for electronic devices. The patent discloses:

"A method and apparatus is disclosed for the customization of electronic equipment of which portable audio players, portable disc players, portable digital games and laptop computers are representative. The electronic equipment may be fitted with a substantially transparent faceplate that may cover removable inserts. These inserts may be customizable to provide unique decorative appearances to the electronic equipment upon which they may be fitted. Decorative designs may either be preprinted on the inserts or a user may produce a customized design."

Claim 1 of the patent reads as follows:

"An electronic device comprising: a base having a first surface; a substantially transparent removable faceplate coupled to the base and covering substantially all of the first surface; and a replaceable ornamental insert positionable between the removable faceplate and the first surface of the base such that a portion of the ornamental insert is viewable through the substantially transparent section, said ornamental insert punched out of a sheet of paper after a user of the electronic device has printed an ornamental design thereon."

Claim 9 of the patent reads as follows:

"A digital audio player comprising: a base with a first surface, the first surface to include an electronic display; a substantially transparent removable faceplate coupled to the base and covering substantially all of the first surface; and a replaceable ornamental insert positionable between the removable faceplate and the first surface of the base, the replaceable ornamental insert includes a display aperture, an upper surface of the replaceable insert having an ornamental design printed thereon, a portion of the ornamental design viewable through the substantially transparent section of the faceplate."

Claim 11 of the patent reads as follows:

"A method comprising: manufacturing an electronic device with a base having a first surface that includes a retention feature to accept an ornamental insert thereon; manufacturing a substantially transparent removable faceplate to couple to the base and to cover substantially all of the first surface; manufacturing a replaceable ornamental insert positionable between the removable faceplate and the first surface of the base; and positioning the insert between the base and faceplate and coupling the faceplate to the base."

Claim 16 of the patent reads as follows:

"An electronic device comprising: a base having an upper surface; an ornamental insert covering a portion of the upper surface; and a faceplate coupled to the base and the faceplate covering all of the upper surface of the base and the faceplate having a substantially transparent section."

The Richardson patent is illustrated in FIG. 1 and is best illustrated in the exploded view in FIG. 3. Referring to the patent text and in particular, beginning on Column 5 Line 52, the patent states:

"The membrane 110 of the present embodiment is constructed by thermoforming a sheet of thin plastic. The plastic is selected to be thin enough that the deformation of a stylus conducts the touch to the touch screen, but thick enough to have enough rigidity that the stylus does not catch and rip the membrane. Additionally, the membrane 110 should have enough thickness to endure scratches and other wear and tear without breaking and sacrificing the protective function. Polyvinylchoride material at 0.010 in to 0.015 in thickness gives acceptable results. Alternatively, membrane 110 may be constructed by injection molding or other methods. Alternative materials may be used by those skilled in the art to achieve the same results while maintaining within the spirit and intent of the present invention.

The membrane 110 in the present embodiment may be translucent or at least partially transparent, so that the images displayed on the PDA may be visible through the membrane 110. The membrane 110 may be tinted or colorized in some applications. For example, a protective cover designed as a decorative cover may incorporate a colorized membrane 110. Further, the membrane may be selectively colorized and the opaqueness may vary. For example, the protective membrane may be printed or painted in the areas not used for the touch screen. A printing process may incorporate a logo, graphics, or labeling for individual buttons for the PDA. The printing process may further incorporate features, such as text or graphics, that are used by the software on the PDA for a purpose such as simplifying data input or for designating an area on the touch screen for a specific function, such as a help function. The printing or painting processes used on the membrane 110 may be purely decorative and may be for aesthetic purposes only. The printing process may also comprise logos or graphics for the brand identity of the PDA cover. Other processes, such as colorizing the raw material for the membrane 110 or adding other components to the raw material, such as metal flakes or other additives, may be used to change the optical features of the membrane 110."

The '0161421 Latto Published patent application is a continuation of the previously discussed issued Latto patent. This patent application was published in 2007 and is still in full force and effect. This patent application has one independent claim which reads as follows:

"A method comprising: providing a user with a sheet precut to a shape suitable for use as the insert for a faceplate of an electronic device; providing software to enable the user to select one of a plurality of designs to print on said sheet; and providing software to enable the user to print the selected design on the sheet to make an insert for a faceplate for an electronic device."

The Seo Design patent protects the shape or the ornamental beauty of the object.

The Ramsdell Published patent application discloses:

"A user-customizable case is provided for at least partially covering a portable electronic device. The case may include first and second panels and a retainer for holding an insert bearing an indicia. The panels may be elastically connected to facilitate receiving many different sizes and shapes of portable electronic devices. The retainer may removably attach to the case to facilitate exchanging the inserts for customizing the device, insignia, or the like. The case may be included in a kit, along with at least one insert and a retainer. Related methods are also disclosed."

The patent application further states:

"Reference is now made to FIG. 1 illustrating one embodiment of the protective case 10 forming one aspect of the present invention. As noted above, one of the features of the case 10 is its ability to not only accommodate myriad portable electronic devices or the like, but also to be easily customized to suit the likes of a particular user. In one embodiment, customization is accomplished by associating an insert 16 bearing or capable of bearing an image (design, logo, or other indicia) with a holder 14, which attaches or secures to the case 10 by a removable retainer 12."

The Lee Published patent application shows sections having various backs including a colored main back. Specifically, referring to the patent text, Section 72 states:

"In some embodiments, first section 230 and second section 240 are manufactured from substantially similar materials having different colors that when configured as media device case 210 result in the central portion of exterior main back portion 331 having a third color, different than the first color and the second color. In these embodiments, the materials can be transparent or translucent. In other embodiments, first section 230 and second section 240 are manufactured from substantially similar materials having substantially similar colors that when configured as media device case 210 result in the central portion of exterior main back portion 331 having a substantially similar color. In these embodiments, the materials can be transparent, translucent, or opaque."

The '0065487 Latto Published patent application is a continuation of the previously discussed Latto Published patent application which was a continuation of the earlier application that resulted in the issued Latto patent.

SUMMARY OF THE INVENTION

The present invention is a single color backing for a cell phone protector case to enable a user to match the color of an outfit the user is wearing. A key innovation of the present invention is that a backing color card is used on the back of the transparent cell phone protector case and is press fit sandwiched between the back of the cell phone and the and the interior of the back of the transparent cell phone protector case which retains the cell phone against the front of the case so that the front face of the cell phone can be seen and used. Unlike most prior art cell phone cases where a decorative accessory is on the front of the cell phone protector case and could possibly interfere with the use of the cell phone, the present invention color accessory is adjacent the back of the cell phone and therefore cannot interfere with the user of the cell phone.

The thickness of the cell phone protector case enables the color backing card to be press fit and sandwiched retained against the back of the cell phone case so that a user can change color backing cards at any time. There are at least sixteen (17) different colored backing cards selected from the group consisting of white, black, red, light pink, dark pink, orange, yellow, purple, dark blue, medium blue, light blue, dark gray, light gray, dark green, light green, combination red and white, and combination pink and white. The two most popular colors are white and black.

In effect, the concept is that the transparent cell phone protector case holds the cell phone where the face of the cell phone is effectively facing away from the cell phone protector case. This cell phone protector case is a snap fit over the cell phone and sandwiches the present invention decorative color card between the transparent cell phone protector case and the back of the cell phone. The invention is to have the beautiful decorative color card between the back of the cell phone and the transparent protector case so that the colored card can be inserted to give the cell phone protector case a different colored appearance. A set of these colored cards can be sold so that an individual can exchange the color to match the outfit they are wearing, such as a dress, hat, scarf, purse, suit, tie, etc, or any other accessory. Therefore, the innovation is to have an insertable colored card inserted between the back of the cell phone and the transparent cell phone protector which is sandwiched onto the back of the cell phone so that the colored card is then sandwiched between the back of the cell phone and the transparent protector case which in turn has an outer rim which is attached onto the front edges of the cell phone protector case.

It is an object of the present invention to provide a decorative color card which can match an outfit a person is wearing, the decorative color card being press fit sandwiched between the back of a cell phone and a transparent back of the cell phone protector case.

It is an additional object of the preset invention to provide a decorative color card which covers the entire back wall of the cell phone so that only the decorative color card is visible from the transparent back wall of the cell phone protector case.

The decorative colored insert card can be made from material selected from the group consisting of paper, cardboard, plastic and polyurethane, Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
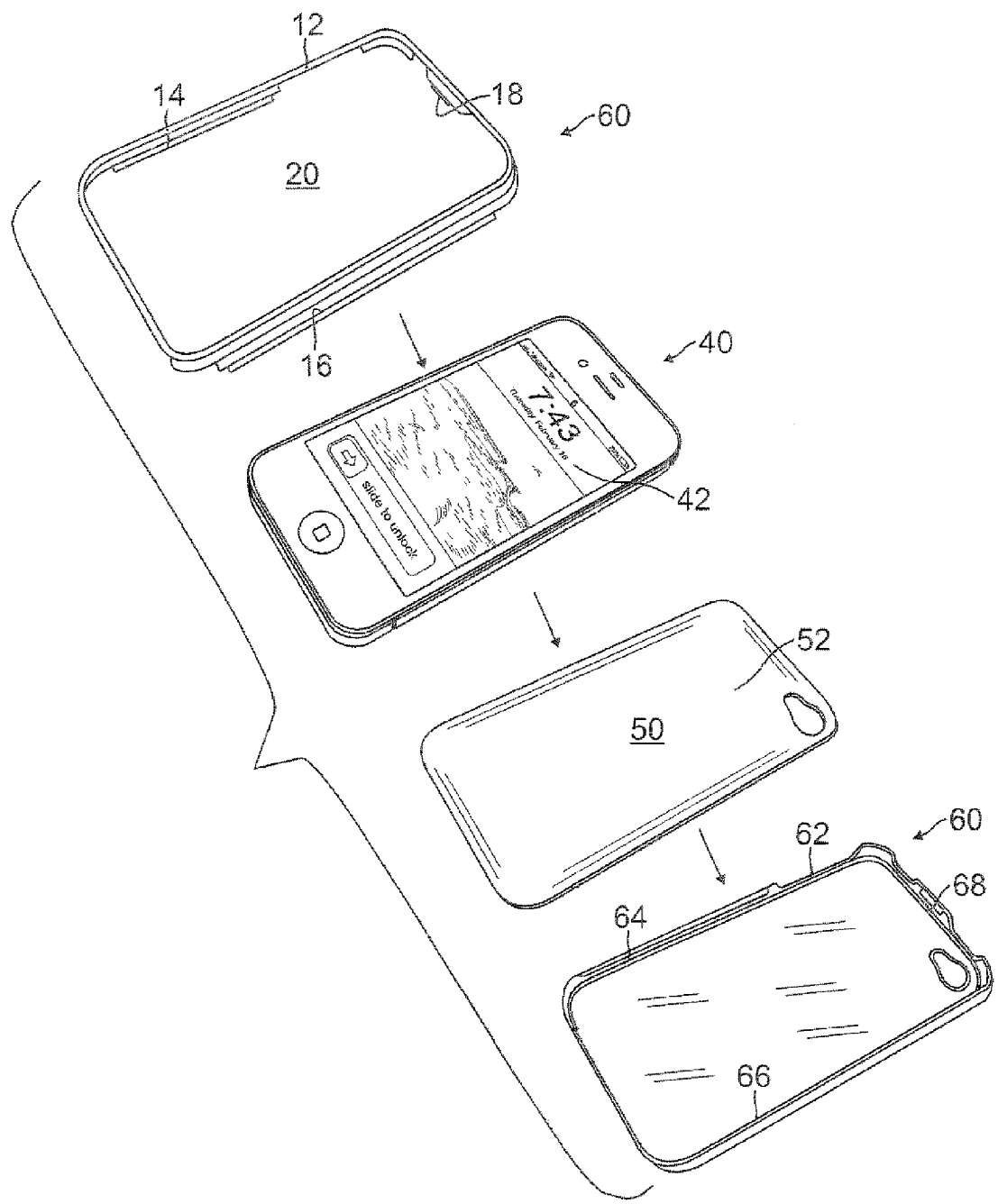
FIG. 1 is a front exploded view of the present invention illustrating from left to right the front of the cell phone protector case, the front of the cell phone, the present invention insertable color card, and the interior of the transparent back cover of the cell phone protector cases.

Referring to FIGS. 1 through 5, in effect, the concept is that the cell phone protector case 8 (see FIG. 5) comes in two parts which are preferably snap fit retained together, a front section which is shown as 10 holds the cell phone and has a circumferential rim 12 which has a pair of oppositely disposed sidewall receiving members 14 and 16 and a top wall receiving member 18 with an open face 20 so that a cell phone can be operated without interference from the cell phone protector case. The cell phone 40 is illustrated with the front face 42 being visible. The third item in the exploded view of FIG. 1 is the present invention insertable color card 50 which is sized to conform to and cover the back (see FIG. 2) of the cell phone 40 and sized to fit within rear section 60 of the cell phone protector case which is transparent. In FIG. 1, the interior facing wall 52 of insertable color card 50 is illustrated. The rear section 60 has a circumferential wall 62 with a pair of sidewall mating members 64 and 66 and a top wall mating member 68 which respectively fit within receiving members 14, 16 and 18 of the front section, to thereby retain the cell phone 40 and insertable color card 50 within the cell phone protector case 8.

Figure 2:
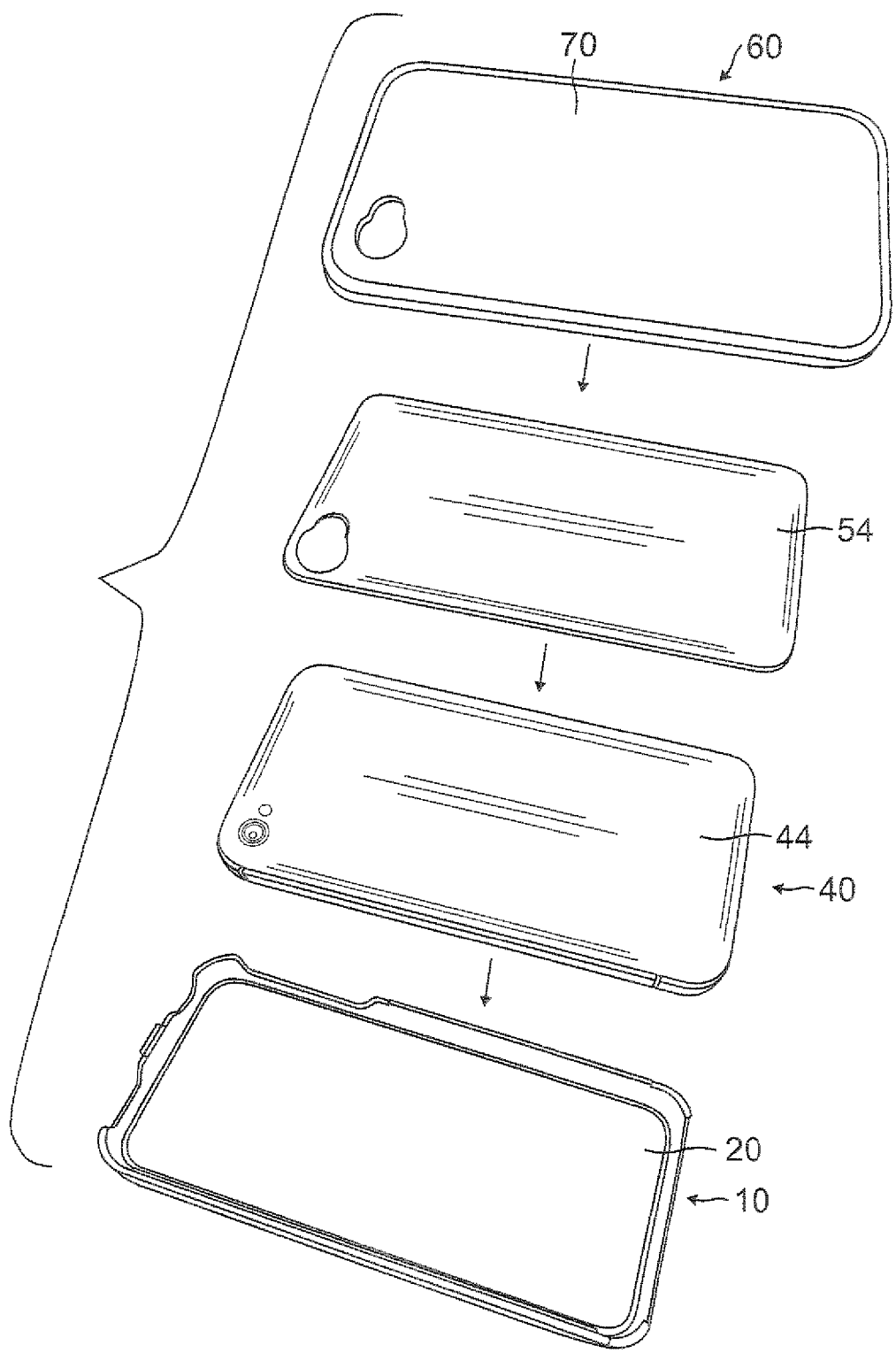
FIG. 2 is a rear perspective view of the present invention illustrating from bottom to top the interior of the front cover of the cell phone protector case, the back of the cell phone, the back of the present invention insertable color card, and the back surface of the transparent cell phone protector case.
Figure 3:
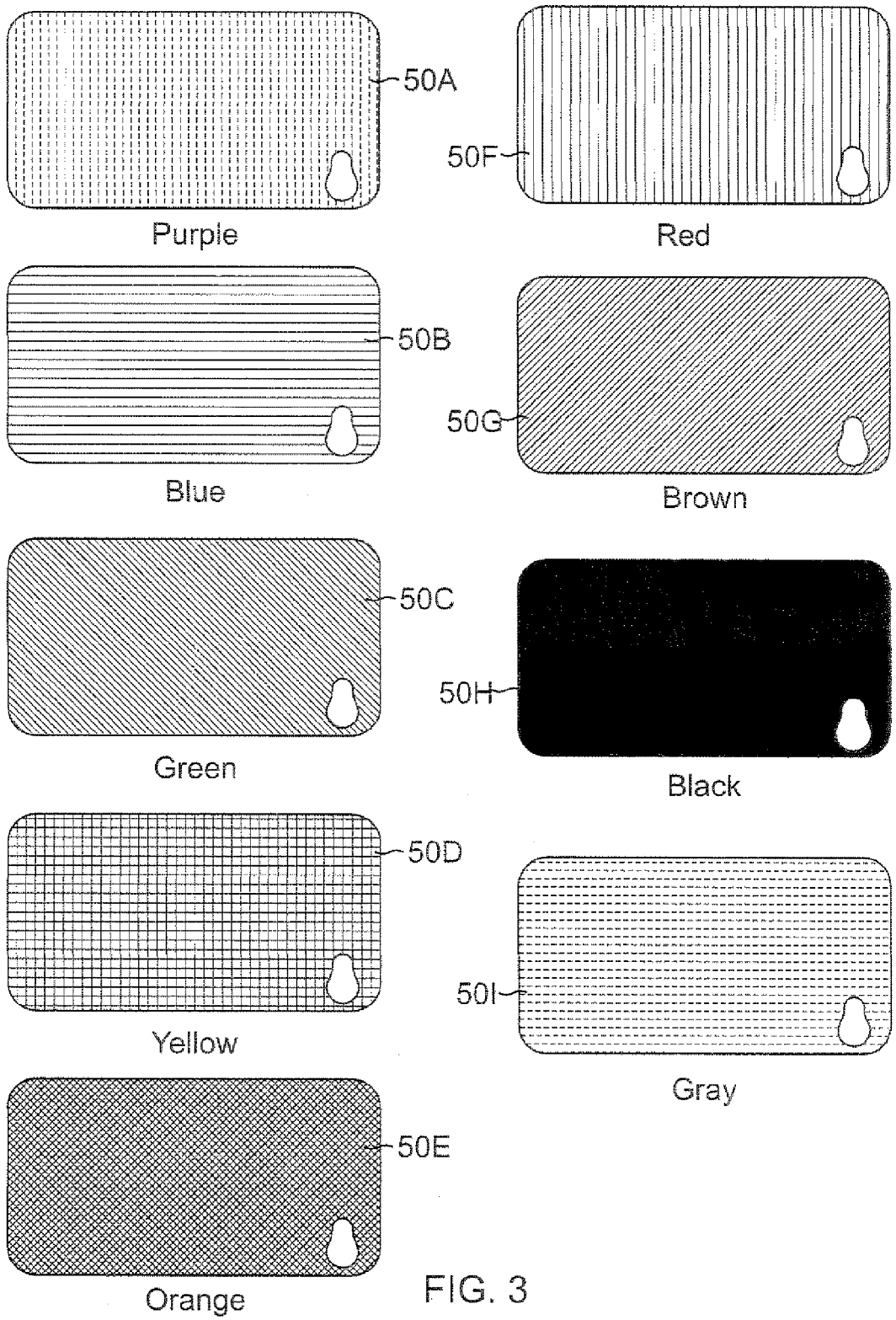
FIG. 3 is a back perspective view of nine different color insertable cards, lined per patent drawing specifications to illustrate from top to bottom and left to right the colors 50A, 50B, 50C, 50D, 50E, 50F, 50G, 50H and 50I.

Referring to FIG. 2, there is illustrated from bottom to top the front section 10 when viewed from its interior, the back surface, the back wall 44 of the cell phone 40, the back wall 54 of the insertable color card 50 and the back 70 of the transparent back section 60. The front section 10 and transparent back section 60 retain the cell phone 40 and one decorative color insert card 50. Preferably the interior facing wall 52 and exterior or back facing wall 54 of the insertable color card 50 are the same color but they can also be different colors. This transparent cell phone protector case sandwiches at least one decorative color insert card as shown in FIGS. 1 and 2 The invention is to insert a card of a different color which is shown in FIG. 3 between the back 42 of the cell phone 40 and the interior face 62 of the transparent back section 60 so that the cell phone protector case 8 is color coordinated with a dress or suit or an accessory such as a scarf, hat, tie, etc. Referring to FIG. 3, nine of the color cards respectively in FIGS., 50A, 50B, 50C, 50D, 50E, 50F, 50G, 50H and 50I are in accordance with the Patent Office drawing rules for the colors: purple, blue, green, yellow, orange, red, brown, black and gray. By way of example, the seventeen preferred colors selected for the colored insert cards are: white, black, red, light pink, dark pink, orange, yellow, purple, dark blue, medium blue, light blue, dark gray, light gray, dark green, light green, combination red and white, and combination pink and white.

Figure 4:
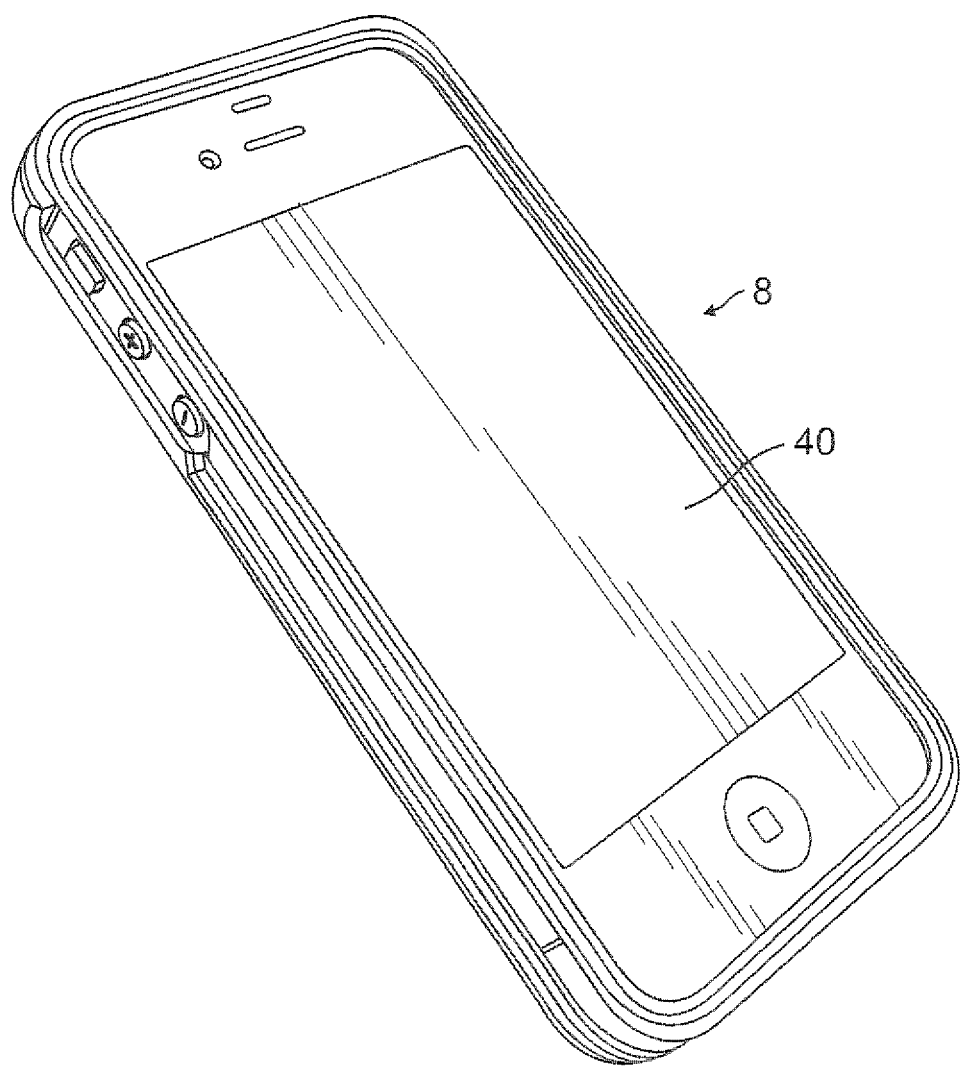
FIG. 4 is a front top perspective view illustrating a cell phone retained within the transparent cell phone protector case with the color card hidden from view since it is blocked by the front of the cell phone.
Figure 5:
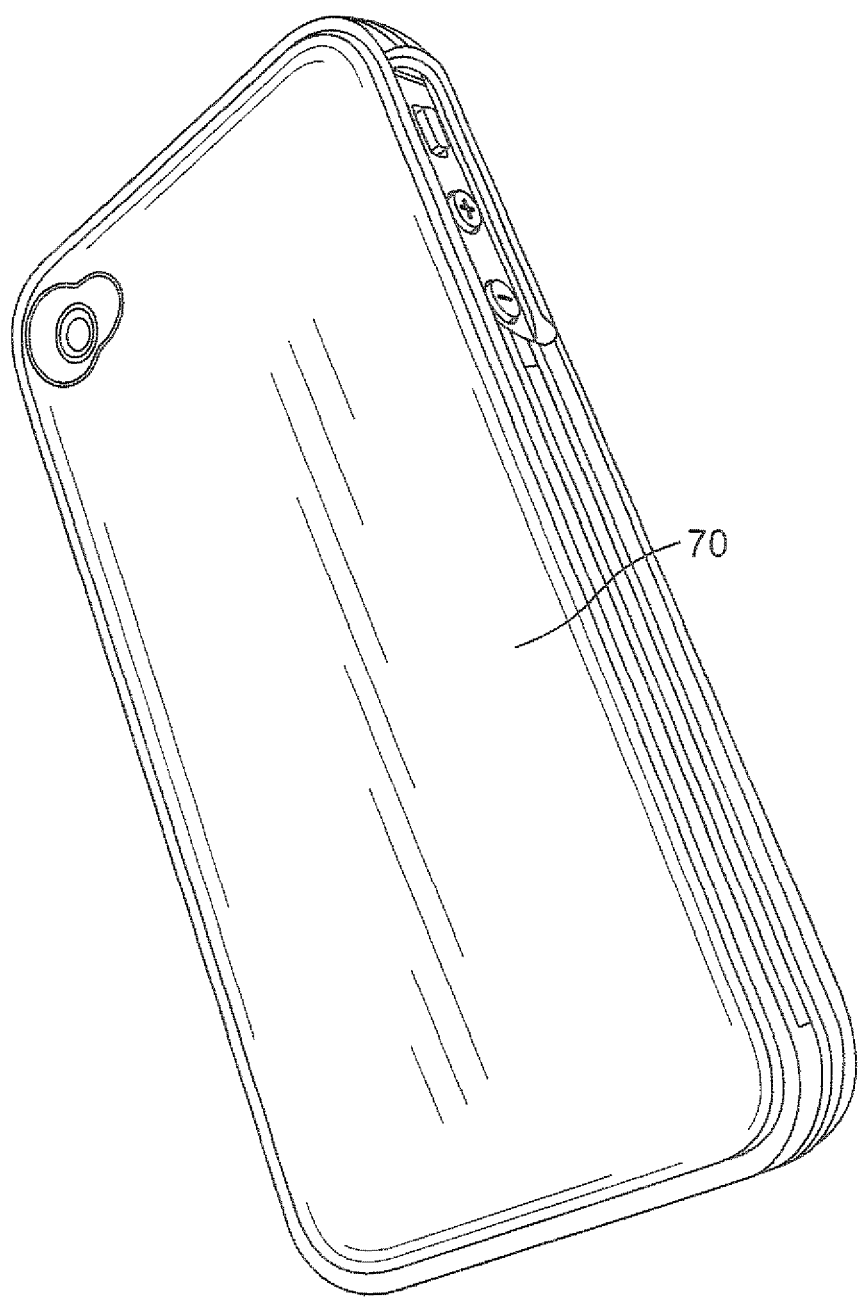
FIG. 5 is a rear perspective view illustrating a cell phone retained within the transparent cell phone protector case with the color card visible through the transparent back of the cell phone protector case.

A color card is inserted so that it gives the cell phone protector case a different colored appearance. A set of these colored cards can be sold so that an individual can exchange the color to match the outfit they are wearing, their purse, or any other accessory. Referring to FIGS. 4 and 5, therefore, the innovation is to have an insertable colored card inserted between the back of the cell phone and the back transparent section of the cell phone protector which is sandwiched onto the back of the cell phone so that the colored card is then sandwiched between the back of the cell phone and the transparent cell phone transparent protector case 60.

The transparent cell phone protector case 8 can be made out of material selected from the group consisting of acrylic, plastic, polyurethane, polyplastic and other hard transparent plastic material. The back section 60 must be transparent. The front section can be transparent or opaque.

Of course the present invention is not intended to be restricted to any particular folin or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A protector case used in conjunction with a cell phone comprising:
   a. a cell phone protector case with an opened front face so that a front face of the cell phone having operational members on the front face of the cell phone are operable without interference from the cell phone protector case; and the front face of the cell phone faces away from a back of the cell phone protector case which is transparent, the cell phone protector case retains the cell phone so that there is a gap between a back of the cell phone protector case and a decorative color insert card which is removably inserted between the back of the cell phone and the transparent back of the cell phone protector case; and
   b. a selected decorative color insert card is inserted into the gap between the back of the cell phone and the transparent back of the cell phone protector case so that the selected decorative color insert card entirely conceals the back of the cell phone from the transparent back of the cell phone protector case and is visible through the back of the transparent cell phone protector case to give the back of the cell phone protector case a colored appearance of the selected color insert card.

2. The protector case used in conjunction with a cell phone in accordance with claim 1, further comprising:
   a. a set of different selected decorative colored insert cards are provided so that an individual can exchange the selected decorative colored insert card to change the color appearance of the cell phone protector case.

3. The protector case used in conjunction with a cell phone in accordance with claim 1, further comprising:
   a. the cell phone protector case is thick enough to retain the selected decorative colored insert card.

4. The protector case used in conjunction with a cell phone in accordance with claim 1, further comprising:
   a. the selected decorative colored insert card is selected from the group consisting of: white, black, red, light pink, dark pink, orange, yellow, purple, dark blue, medium blue, light blue, dark gray, light gray, dark green, light green, combination red and white, and combination pink and white.

5. The protector case used in conjunction with a cell phone in accordance with claim 1, further comprising:
   a. the color of both a front face and a back face of the selected decorative colored insert card are the same.

6. The protector case used in conjunction with a cell phone in accordance with claim 1, further comprising:
   a. the color of a front face of the selected decorative colored inset card is a different color from a back face of the colored insert card.

7. The protector case used in conjunction with a cell phone in accordance with claim 1, further comprising:
   a. the transparent back of the cell phone protector case is made out of material selected from the group consisting of acrylic, plastic, polyurethane, polyplastic and other hard transparent plastic material.

8. The protector case used in conjunction with a cell phone in accordance with claim 1, further comprising:
   a. the selected decorative colored insert card is made of material selected from the group consisting of:
   paper, cardboard, plastic and polyurethane.

9. A protector case used in conjunction with a cell phone, comprising
   a. a cell phone protector case in two sections which are snap fit retained together, a front section which holds the cell phone and has a circumferential rim which has a pair of oppositely disposed sidewall receiving members and a top wall receiving member with an open face so that a cell phone is operable without interference from the cell phone protector case;

b. the cell phone is retained in the front section with its front face aligned with the open face in the first section of the cell phone protector case;

c. an insertable color card which is sized to conform to and cover the back of the cell phone and sized to fit within an area between the back of the cell phone and the back section of the cell phone protector case, the back section having a transparent back wall; and d. the back section of the cell phone protector case has a circumferential wall with a pair of sidewall mating members and a top wall mating member which respectively fit within receiving members of the front section, to thereby retain the cell phone and insertable color card within the cell phone protector case so that the insertable color card is removably retained within the back of the cell phone and transparent back wall of the cell phone protector case and retained between the back of the cell phone and the back wall of the cell phone protector case so that the inserted color card is visible through the transparent back wall of the cell phone protector case.

10. The protector case used in conjunction with a cell phone in accordance with claim 9, further comprising:

a. an interior facing surface and exterior facing surface of the insertable color card are the same color.

11. The protector case used in conjunction with a cell phone in accordance with claim 9, further comprising:

a. an interior facing surface and exterior facing surface of the insertable color card are different colors.

12. The protector case used in conjunction with a cell phone in accordance with claim 9, further comprising:

a. the insertable color card is selected from the group of colors consisting of: white, black, red, light pink, dark pink, orange, yellow, purple, dark blue, medium blue, light blue, dark gray, light gray, dark green, light green, combination red and white, and combination pink and white.

13. The protector case used in conjunction with a cell phone in accordance with claim 9, further comprising:

a. the transparent rear wall of the cell phone protector case is made out of material selected from the group consisting of acrylic, plastic, polyurethane, polyplastic and other hard transparent plastic material.

14. The protector case used in conjunction with a cell phone in accordance with claim 9, further comprising:

a. the insertable color card is made out of material selected from the group consisting of paper, cardboard, plastic and polyurethane.

15. A protector case used in conjunction with a cell phone comprising:

a. the cell phone protector case having a transparent back section which retains a decorative color insert card and is connected to a front case section;

b. a cell phone retained in an operative condition in the cell phone protector case between a pair of affixed front and transparent back sections of the cell phone protector case so that the decorative color insert card conceals the back of the cell phone and is visible though the transparent back of the cell phone protector case.

16. A protector case used in conjunction with a cell phone, comprising a. a cell phone protector case in two sections which are retained together, a front section which holds the cell phone and has at least one receiving member, the front section having an open face so that a cell phone is operable without interference from the cell phone protector case;

b. the cell phone is retained in the front section with its front face aligned with the open face in the first section of the cell phone protector case;

c. a removably insertable color card which is sized to conform to and cover a back of the cell phone and sized to fit within a rear section of the cell phone protector case which is transparent; and d. the rear section of the cell phone protector case having at least one mating member which is received with a mating member of the at least one receiving member of the front section, to thereby retain the cell phone and removably insertable color card within the cell phone protector case so that the removably insertable color card is visible through the transparent back wall of the cell phone protector and completely covers the back of the cell phone.

17. The protector case used in conjunction with a cell phone in accordance with claim 16, further comprising:

a. an interior facing surface and exterior facing surface of the insertable color card are the same color.

18. The protector case used in conjunction with a cell phone in accordance with claim 16, further comprising:

a. an interior facing surface and exterior facing surface of the insertable color card are different colors.

19. The protector case used in conjunction with a cell phone in accordance with claim 16, further comprising:

a. the insertable color card is selected from the group of colors consisting of: white, black, red, light pink, dark pink, orange, yellow, purple, dark blue, medium blue, light blue, dark gray, light gray, dark green, light green, combination red and white, and combination pink and white.

20. The protector case used in conjunction with a cell phone in accordance with claim 16, further comprising:

a. the transparent rear section of the cell phone protector case is made out of material selected from the group consisting of acrylic, plastic, polyurethane, polyplastic and other hard transparent plastic material.

21. The protector case used in conjunction with a cell phone in accordance with claim 16, further comprising:

a. the insertable color card is made out of material selected from the group consisting of paper, cardboard, plastic and polyurethane.

* * * * *